United States Patent
Sharma et al.

(10) Patent No.: US 8,824,273 B2
(45) Date of Patent: *Sep. 2, 2014

(54) CROSSOVER OPERATION IN A 1+1 PROTECTION SWITCHING ENVIRONMENT

(75) Inventors: Manish Sharma, Eden Prairie, MN (US); Xinkuan Zhou, Chapel Hill, NC (US); Joe Polland, Eden Prairie, MN (US); Jun-Ming Wu, Xinzhuang (TW)

(73) Assignee: ADC DSL Systems, Inc., Shakopee, MN (US)

( * ) Notice: Subject to any disclaimer, the term of this patent is extended or adjusted under 35 U.S.C. 154(b) by 630 days.

This patent is subject to a terminal disclaimer.

(21) Appl. No.: 13/027,610

(22) Filed: Feb. 15, 2011

(65) Prior Publication Data

US 2011/0134750 A1 Jun. 9, 2011

Related U.S. Application Data

(63) Continuation of application No. 11/876,330, filed on Oct. 22, 2007, now Pat. No. 8,462,618.

(51) Int. Cl.
| | |
|---|---|
| *H04L 1/00* | (2006.01) |
| *H04L 29/14* | (2006.01) |
| *H04L 12/56* | (2006.01) |
| *H04L 12/28* | (2006.01) |
| *H04L 12/26* | (2006.01) |
| *H04M 11/06* | (2006.01) |
| *H04L 12/24* | (2006.01) |

(52) U.S. Cl.
CPC ........... *H04L 69/40* (2013.01); *H04L 45/28* (2013.01); *H04L 41/0654* (2013.01); *H04L 41/0686* (2013.01); *H04L 12/2856* (2013.01); *H04L 12/2898* (2013.01); *H04L 41/0681* (2013.01); *H04L 43/0811* (2013.01); *H04M 11/062* (2013.01)

USPC ............................ 370/216; 370/389; 709/238

(58) Field of Classification Search
None
See application file for complete search history.

(56) References Cited

U.S. PATENT DOCUMENTS

| | | | |
|---|---|---|---|
| 5,566,171 A | 10/1996 | Levinson | |
| 5,982,741 A * | 11/1999 | Ethier | ........................... 370/201 |

(Continued)

OTHER PUBLICATIONS

U.S. Patent and Trademark Office, "Advisory Action", U.S. Appl. No. 11/876,330, Nov. 22, 2011, p. 1-3.

(Continued)

*Primary Examiner* — Khoa Huynh
(74) *Attorney, Agent, or Firm* — Fogg & Powers LLC

(57) ABSTRACT

A communication system that comprises at least two links to carry signals, a first communication unit and a second communication unit. The first communication unit comprises at least two ports, each port configured to transmit and receive signals; and a logic unit configured to process the signals transmitted and received by each of the at least two ports in the first communication unit. The second communication unit comprises at least two ports, each port configured to transmit and receive signals and coupled to a respective one of the at least two ports in the first communication unit via a respective one of the at least two links; a programmable logic unit configured to process the signals transmitted and received by each of the at least two ports in the second communication unit; and a processor. The processor is configured to detect a crossover connection between one of the at least two ports in the second communication unit and the respective one of the at least two ports in the first communication unit based on an analysis of a pair identifier field in a message received at the second communication unit, wherein the pair identifier field is separate from the address field of the received message.

20 Claims, 6 Drawing Sheets

(56) References Cited

U.S. PATENT DOCUMENTS

| | | | |
|---|---|---|---|
| 6,442,137 B1* | 8/2002 | Yu et al. | 370/232 |
| 6,618,785 B1* | 9/2003 | Whitby-Streves | 710/305 |
| 7,818,389 B1* | 10/2010 | Chiang et al. | 709/212 |
| 8,004,961 B1* | 8/2011 | Buchanan et al. | 370/216 |
| 2003/0016654 A1* | 1/2003 | Das et al. | 370/351 |
| 2003/0095502 A1* | 5/2003 | Glaser et al. | 370/228 |
| 2004/0190444 A1 | 9/2004 | Trudel et al. | |
| 2006/0203716 A1* | 9/2006 | Gilligan | 370/216 |
| 2006/0291500 A1* | 12/2006 | Kroninger et al. | 370/465 |

OTHER PUBLICATIONS

U.S. Patent and Trademark Office, "Final Office Action", U.S. Appl. No. 11/876,330, Feb. 18, 2010, p. 1-26.
U.S. Patent and Trademark Office, "Final Office Action", U.S. Appl. No. 11/876,330, Dec. 13, 2010, pp. 1-25.
U.S. Patent and Trademark Office, "Final Office Action", U.S. Appl. No. 11/876,330, Sep. 7, 2011, p. 1-20.
U.S. Patent and Trademark Office, "Final Office Action", U.S. Appl. No. 11/876,330, Nov. 23, 2012, pp. 1-21.
U.S. Patent and Trademark Office, "Office Action", U.S. Appl. No. 11/876,330, Aug. 24, 2009, pp. 1-23.
U.S. Patent and Trademark Office, "Office Action", U.S. Appl. No. 11/876,330, Jun. 24, 2010, pp. 1-23.
U.S. Patent and Trademark Office, "Office Action", U.S. Appl. No. 11/876,330, Mar. 14, 2011, pp. 1-23.
U.S. Patent and Trademark Office, "Office Action", U.S. Appl. No. 11/876,330, May 3, 2012, pp. 1-26.
U.S. Patent and Trademark Office, "Notice of Allowance", U.S. Appl. No. 11/876,330, Feb. 27, 2013, pp. 1-5.

* cited by examiner

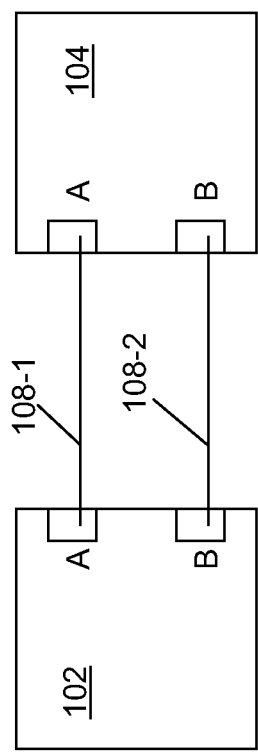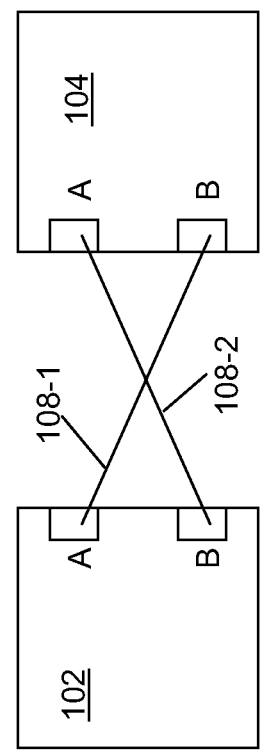

CROSSOVER OPERATION IN A 1+1 PROTECTION SWITCHING ENVIRONMENT

CROSS-REFERENCE TO RELATED APPLICATIONS

This application is a continuation of pending U.S. application Ser. No. 11/876,330 entitled "CROSSOVER OPERATION IN A 1+1 PROTECTION SWITCHING ENVIRONMENT," filed Oct. 22, 2007, which is incorporated herein by reference.

BACKGROUND

In a typical 1+1 protection switching arrangement, there are two communication units connected in a point to point configuration. One unit is configured as a central unit (also known as an STU-C), and the other as a remote unit (also known as an STU-R). Each unit is connected by two links. Both links carry identical traffic at the physical layer. However, only one link is considered active while the other link acts as backup. When there is a failure on the active link, a protection switch occurs making the backup link active. In this way, communication is not interrupted when a failure occurs on the active link.

SUMMARY

In one embodiment, a communication system is provided. The communication system comprises at least two links to carry signals, a first communication unit and a second communication unit. The first communication unit comprises at least two ports, each port configured to transmit and receive signals; and a logic unit configured to process the signals transmitted and received by each of the at least two ports in the first communication unit. The second communication unit comprises at least two ports, each port configured to transmit and receive signals and coupled to a respective one of the at least two ports in the first communication unit via a respective one of the at least two links; a programmable logic unit configured to process the signals transmitted and received by each of the at least two ports in the second communication unit; and a processor. The processor is configured to detect a crossover connection between one of the at least two ports in the second communication unit and the respective one of the at least two ports in the first communication unit based on an analysis of a pair identifier field in a message received at the second communication unit, wherein the pair identifier field is separate from the address field of the received message.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which:

FIGS. 1A and 1B are block diagrams of a communication system according to embodiments of the present invention.

In accordance with common practice, the various described features are not drawn to scale but are drawn to emphasize specific features relevant to the present invention. Like reference numbers and designations in the various drawings indicate like elements.

DETAILED DESCRIPTION

Figure 2:
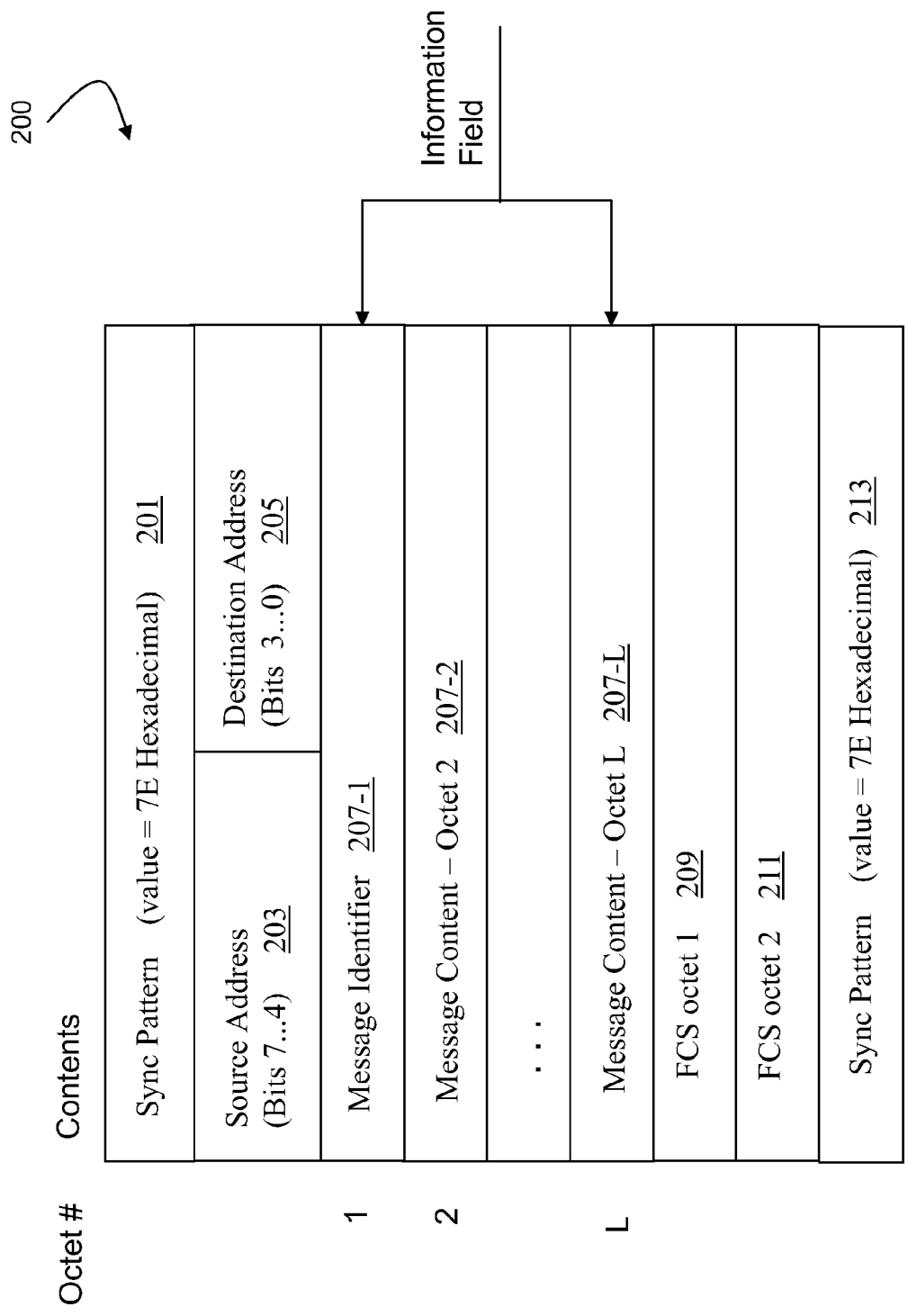
FIG. 2 is a representation of a conventional embedded operations channel message format.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

Embodiments of the present invention provide support for crossover connections in a 1+1 protection switching environment by enabling automatic detection of crossover couplings as well as the ability to configure a programmable logic unit based on the detection of crossover couplings. Configuring the programmable logic unit based on the coupling between two communication units enables data transfer to succeed even in the presence of crossover couplings.

FIG. 1A is a block diagram of a communication system 100 according to embodiments of the present invention. Communication system 100 includes two communication units 102 and 104 coupled together using 1+1 protection switching. In this embodiment, communication units 102 and 104 are configured according to the G.SHDSL standard. In particular, communication unit 102 is a central unit (such as a line card in a DSLAM) and communication unit 104 is a remote unit (such as a remote DSL modem in a subscriber premise). Although the G.SHDSL standard is used in this embodiment, other communication technologies can be used in other embodiments, such as cable modem technology and other DSL technologies (e.g. ADSL, VDSL, etc.).

Communication unit 102 is coupled to communication unit 104 over two links 108-1 and 108-2. Each link 108-1 and 108-2 is coupled to one of two ports (labeled port A and port B) in each of communication units 102 and 104. Notably, communication units 102 and 104 are depicted as being coupled directly together in FIGS. 1A and 1B for purposes of explanation. However, it is to be understood that one or more regenerators can be used between communication units 102 and 104 in embodiments of the present invention.

Each link 108-1 and 108-2 carries a copy of the data traffic at the physical layer. One link is designated as the active link, and the other link acts as backup in case the active link fails. In some embodiments, the active link is chosen based on an a priori assignment. For example, in some embodiments, the link coupling port A in communication unit 102 to communication unit 104 is chosen as the default active link. In other embodiments, the active link is chosen based on an analysis of the line characteristics of each link 108-1 and 108-2 to choose the link with the best line quality. Links 108-1 and 108-2 are twisted pair links in this embodiment. However, in other embodiments, other types of links are used, such as fiber optic cable, and coaxial cable, etc.

Port A of communication unit 102 and port A of communication unit 104 form a connection pair in this example. Similarly, port B of communication unit 102 and port B of communication unit 104 form a second connection pair in this example. A connection pair is a set of two ports, one from each communication unit, which are mapped to corresponding physical devices and pins. Hence, the connection of port A to port A over link 108-1 is also referred to as loop A or pair 1 and the connection of port B to port B over link 108-2 is also referred to as loop B or pair 2. A crossover connection is a connection of one port from a connection pair to a port of a different connection pair. For example, in FIG. 1B, port A of communication unit 102 is coupled to port B of communication unit 104 in a crossover connection.

Conventional communication units using 1+1 protection switching must connect the two ports in a connection pair together (e.g. port A to port A as shown in FIG. 1A) in order for data to be transferred. Thus, a communication unit communicating over port A assumes it is communicating over loop A (i.e. port A coupled to port A of the other communication unit). A crossover connection, however, prevents the proper transfer of data as well as the functioning of 1+1 protection switching in conventional communication units. In particular, coordinated protection switching (both units instructed to switch to a specific loop) is impeded by crossover connections. For example, an instruction for communication units 102 and 104 in FIG. 1B to switch from loop A to loop B does not result in protection switching because communication unit 104 is already transmitting to port B. Another crossover problem for conventional communication units deals with local and remote alarms. For example, communication unit 104 is communicating using port B, but communication unit 104 needs to return alarms associated with loop A since it is coupled to port A in communication unit 102.

In contrast to conventional communication units, communication units according to embodiments of the present invention enable successful crossover couplings. In operation, each link 108-1 and 108-2 carries an embedded operations channel (EOC), where messages can be sent between units. Each communication unit 102 and 104 periodically sends a message on the EOC channel, such as discovery probes, inventory requests, maintenance requests, etc. At least at startup, EOC messages are sent on both links 108-1 and 108-2. The EOC messages are sent on both links 108-1 and 108-2 at startup in case one link has failed from the beginning Each communication unit 102 and 104 analyzes the other's EOC message to determine which ports are coupled together. In particular, each EOC message includes a pair identifier field. As stated above, a communication unit assumes that the connection pairs are properly coupled. Thus, a communication unit assumes, for example, that port A is coupled to port A and the Pair identifier field of an EOC message transmitted from port A will identify pair 1 or loop A. In particular, the pair can be identified by indicating from which port (e.g. A or B) the EOC message was sent. Hence, if there is a crossover, as shown in FIG. 1B for example, communication units 102 and 104 will detect the crossover by comparing the pair identifier of a received EOC message with the pair ID of the port the EOC message was received on.

When a crossover is detected, one of communication units 102 and 104 changes its configuration to account for the crossover. In particular, a programmable logic unit, such as a field programmable gate array, is configured to reverse the timeslots assigned to each of ports A and B in the communication unit. For example, if the first n timeslots of an internal PCM stream are assigned to port A, a programmable logic unit is configured to pass the first n timeslots to port B when a crossover is detected.

Only one of the communication units need be configured for crossover operation. The communication unit which changes configuration is determined a priori. For example, in some embodiments, the remote unit changes its configuration. In this example embodiment, communication unit 104 is a remote unit. Therefore, in this embodiment, communication unit 104 changes its configuration when a crossover is detected. In this way, embodiments of the present invention enable successful communication despite a crossover. In addition, the communication unit which does not change its configuration uses a logic unit which is not programmable in some embodiments. For example, if the central unit does not change its configuration, its logic unit can be an application specific integrated circuit (ASIC) rather than a programmable logic unit such as a field programmable gate array (FPGA).

After configuring communication unit 104 based on the port couplings between communication units 102 and 104, each communication unit 102 and 104 monitors for a switch event. Exemplary switch events include, but are not limited to, Loss of Sync Word (LOSW) alarm, errored second threshold, margin threshold crossing, loop attn. threshold crossing, and segment defect. Once a switch event is detected, each communication unit 102 and 104 switches from the active link to the back-up link. That is, each communication unit 102 and 104 begins processing the data received on the back-up link. In embodiments of the present invention, communication units 102 and 104 are aware of a crossover connection as described above. Thus, when switching to the back-up link, coordinated protection switching functions properly as one of the communication units is configured to account for the crossover connection. In particular, the communication unit configured for the crossover connection knows to switch to the opposite port of the other communication unit.

In some embodiments, switching is non-revertive, meaning if communication units 102 and 104 switch from link 108-1 to link 108-2, the active link will continue to be link 108-2 even if link 108-1 subsequently recovers. If another switch event occurs and the original active link has recovered, communication units 102 and 104 switch back to the original active link. Hence, 1+1 protection switching is provided even in the presence of a crossover coupling between communication units 102 and 104.

FIG. 2 is a block diagram representation of an exemplary format of a conventional EOC message 200 used in the G.SHDSL standard (ITU G.991.2). EOC message 200 comprises fields 201 through 213 and is packed as an integral number of octets. Fields 201 and 213 are each a sync pattern comprised of the hexadecimal value 7E. Sync patterns separate separate EOC frames and indicate the start of an EOC frame. Field 203 is the source address field and field 205 is the destination address field. Fields 203 and 205 are packed in to a single octet to minimize frame size. In particular, field 203 occupies bits 7 to 4 and field 205 occupies bits 3 to 0. Field 205 indicates the communication unit for which EOC message 200 is intended and field 203 indicates the communication unit from which the message is being sent. Permitted values for fields 203 and 205 include STU-C, STU-R, and a regenerator 1 through 8.

Fields 207-1 through 207-L comprise the information field of EOC message 20*o*, where L is the total number of octets in the information field. In particular, field 207-1 identifies the type of message being sent. Exemplary EOC message types include discovery probes/responses, inventory requests/responses, etc. Fields 207-2 through 207-L in a conventional EOC message contain the message content. Fields 209 and 211 are frame check sequence fields used for error detection and correction.

Figure 3:
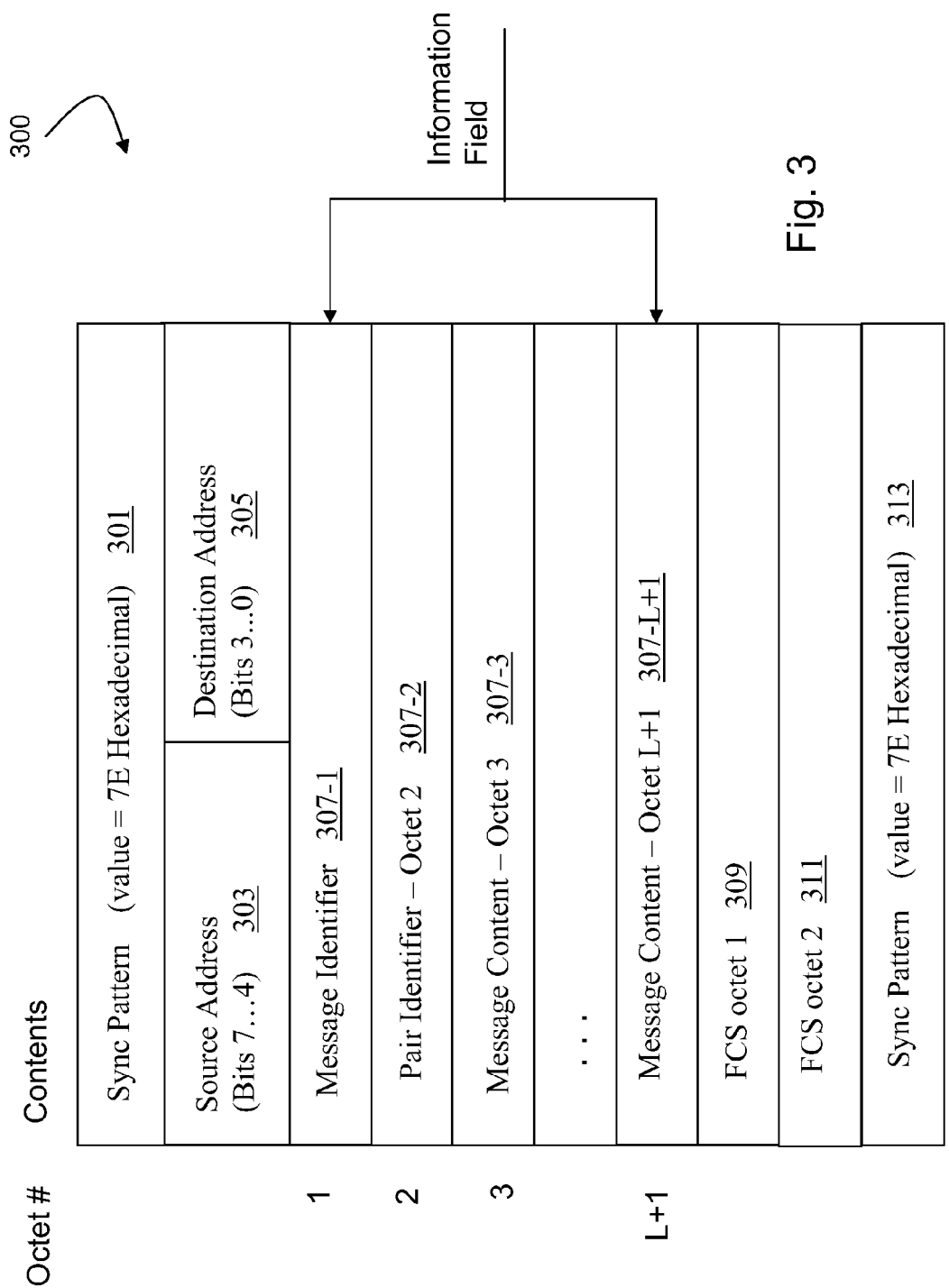
FIG. 3 is a representation of an embedded operations channel message format according to embodiments of the present invention.

FIG. 3 is a block diagram representation of an exemplary format of an EOC message 300 according to embodiments of the present invention. EOC message 300 also includes fields 301 through 313 as with the conventional EOC message 200 described above. EOC message 300 is different from EOC message 200, however, due to the inclusion of a pair identifier field 307-2. The pair identifier field 307-2 identifies the port from which EOC message 300 was sent. In addition, pair identifier field 307-2 offsets all following fields by one byte when compared to conventional EOC message 200. In particular, the message content is contained in fields 307-3 through 307-L+1 rather than 207-2 through 207-L as in conventional EOC message 200, where L is the total number of octets in EOC message 200 for the same message content.

By comparing the value of pair identifier field 307-2 with the pair ID of the port at which message 300 is received, a crossover connection is detected. For example, port A of communication unit 104 in FIG. 1B is expecting field 307-2 of an EOC message from communication unit 102 to indicate port A. However, since the ports are crossed in FIG. 1B, field 307-2 of an EOC message received at port A of communication unit 104 from communication unit 102 via link 108-2 indicates port B of communication unit 102. Hence, communication unit 104 detects the crossover connection and configures its programmable logic unit to compensate for the crossover connection.

Figure 4:
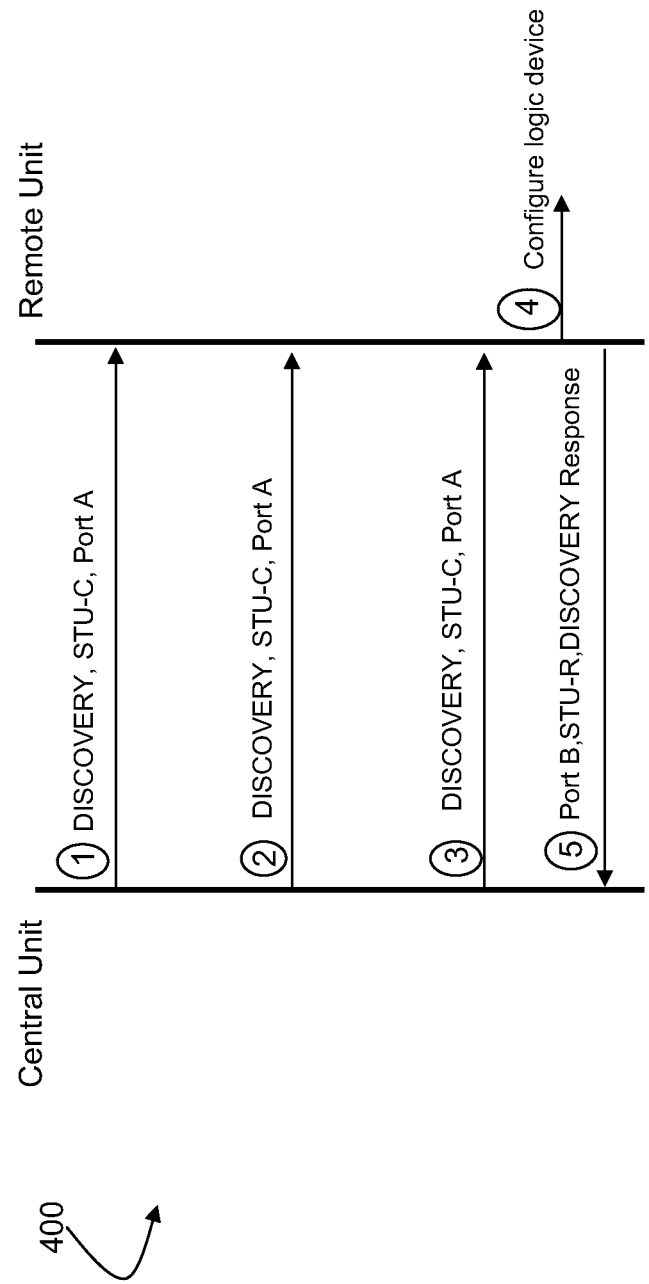
FIG. 4 is a diagram showing message exchange between two communication units according to embodiments of the present invention.

FIG. 4 is a diagram showing EOC message exchange between two communication units (such as communication units 102 and 104) according to embodiments of the present invention. In FIG. 4, time progresses vertically from top to bottom. Arrow 1 represents an EOC message, such as EOC message 300, sent from a central communication unit to a remote unit. In particular, in this embodiment the EOC message sent from the central communication unit is a discovery probe. As described above, the EOC message contains a pair identifier field which identifies the port from which the EOC message was sent. In this example, the central unit EOC message is sent from port A. Arrows 2 and 3 represent the EOC message being sent again from the central unit. The redundancy in EOC messages is useful for verifying that there is a crossover before configuring the PLU, in the remote unit for example, for crossover operation.

In this example, the remote unit receives the EOC message at port B. Thus, by comparing the value of the pair identifier field in the received EOC message with the port at which the EOC message was received, the remote unit is able to detect a crossover connection. The remote unit then configures its PLU for crossover operation as indicated by arrow 4. Finally, arrow 5 represents an EOC message from the sent from the remote unit to the central unit. In this example, the EOC message sent from the remote unit is a discovery response.

Figure 5:
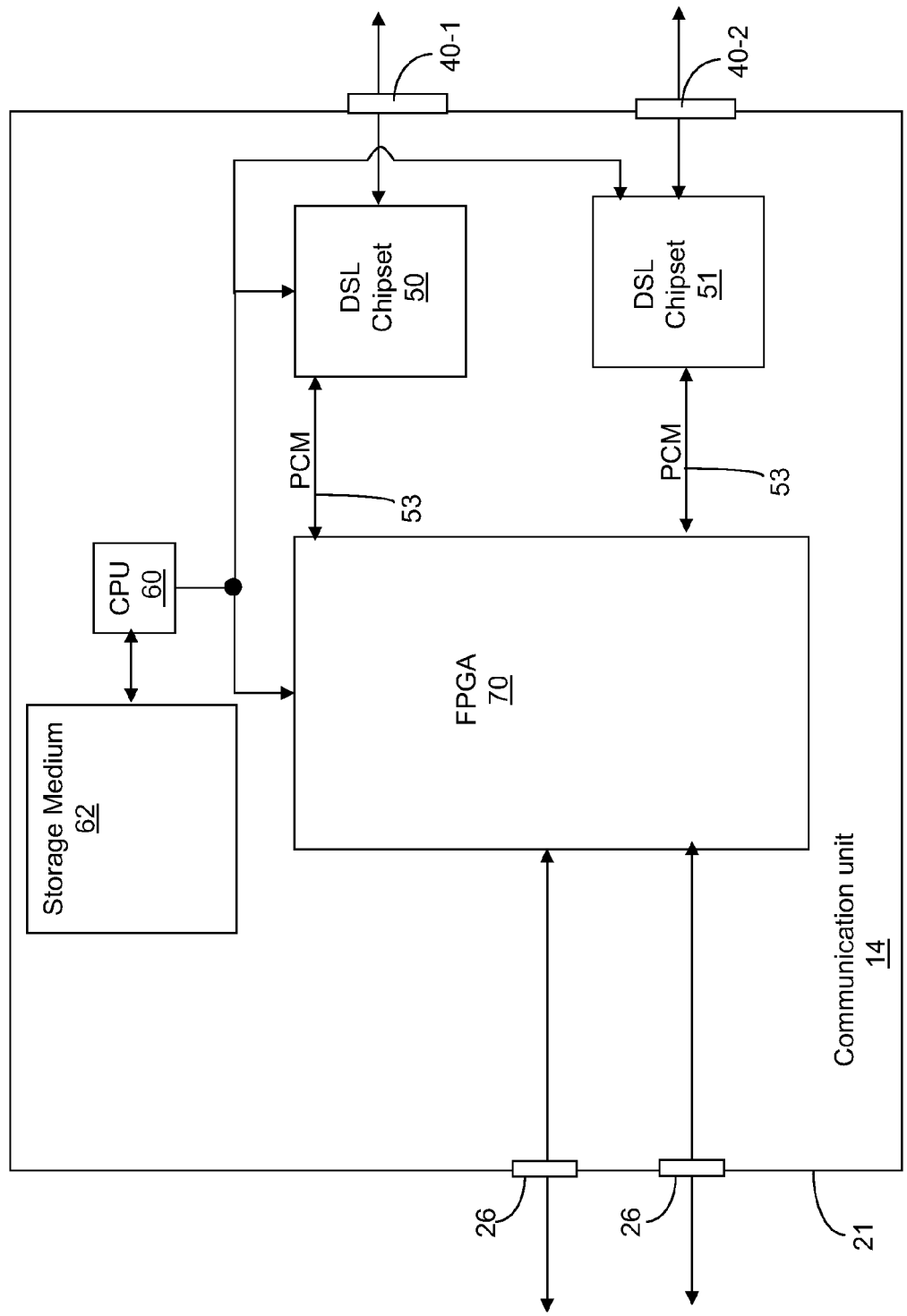
FIG. 5 is a block diagram of a communication unit according to embodiments of the present invention.

FIG. 5 is a block diagram of a communication unit 14 according to embodiments of the present invention. Communication unit 14 is a remote unit in this embodiment and includes a plurality of application ports 26 on the user interface side 21 and two DSL ports 40 each coupled to a link such as links 108-1 and 108-2 as in FIG. 1A. The input received over each DSL port 40 is sent to a respective DSL chipset 50 or 51. In this embodiment, DSL ports 40 are configured for G.SHDSL and chipsets 50 and 51 are G.SHDSL chipsets. The DSL chipsets 50 and 51 are each coupled to a programmable logic unit (PLU) 70 via a pulse code modulation (PCM) interface 53. In this embodiment the programmable logic unit is a field programmable gate array (FPGA). However, in other embodiments other programmable logic units are used such as a complex programmable logic device (CPLD). The PLU 70 and the DSL chipsets 50 and 51 are controlled by a central processing unit 60, which is responsible for configuration, status and error handling of the communication unit 14.

Communication unit 14 sends an EOC message, such as EOC message 300, over each port 40-1 and 40-2 to another communication unit. Communication unit 14 also receives EOC messages from the other communication unit over each port 40-1 and 40-2. Processing unit 60 analyzes the received EOC messages to detect a crossover as described above. If a crossover is detected, processing unit 60 configures PLU 70 for crossover operation. In particular, processing unit 60 sets a flag in a register inside PLU 70 which indicates that crossover operation is enabled. If the flag is not set, PLU 70 passes timeslots on a PCM stream straight through to its corresponding port 40-1 or 40-2. For example, if the first n timeslots are assigned to port 40-1 and the second n timeslots to port 40-2, PLU 70 passes the timeslots to the corresponding port when in normal operation. When in crossover operation, however, PLU 70 switches the timeslots. Hence, in this example, PLU 70 switches the first n timeslots to port 40-2 and the second n timeslots to port 40-1 to account for the crossover connection. In addition, PLU 70 switches alarms, etc. to compensate for the crossover connection.

Processing unit 60 is communicatively coupled to a storage medium 62, which stores processor readable instructions. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Processing unit 60 executes software and/or firmware that causes processing unit 60 to perform at least some of the processing described herein. At least a portion of such software and/or firmware executed by processing unit 60 and any related data structures are stored in storage medium 62 during execution. The software and/or firmware executed by the central processing unit 60 comprises a plurality of program instructions that are stored or otherwise embodied on a storage medium 62 from which at least a portion of such program instructions are read for execution by the central processing unit 60. In one implementation, the central processing unit 60 comprises processor support chips and/or system support chips such as ASICs.

Figure 6:
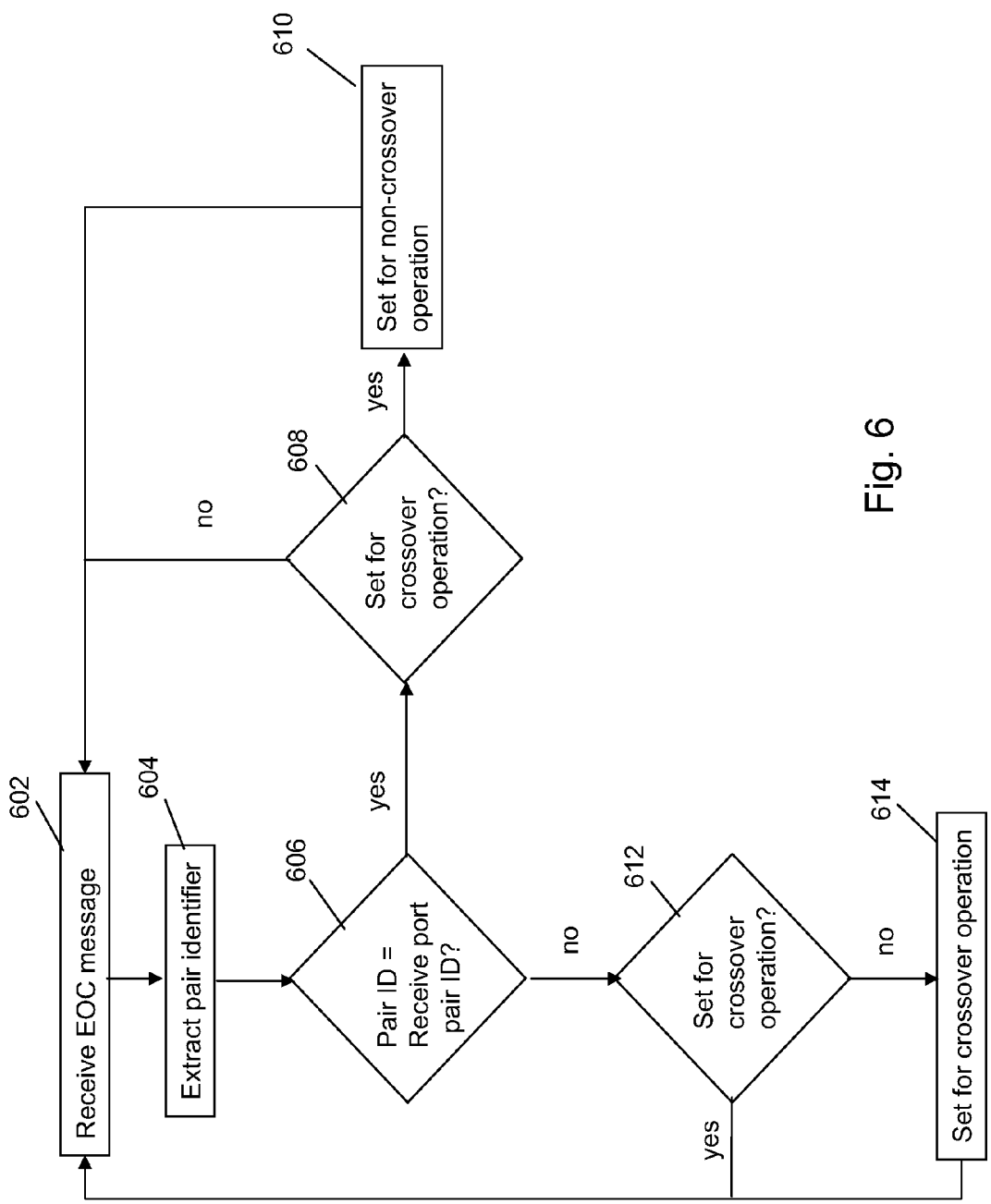
FIG. 6 is a flow chart depicting a method of providing crossover operation according to embodiments of the present invention.

FIG. 6 is a flow chart depicting a method 600 of providing crossover operation according to embodiments of the present invention. Method 600 can be implemented in a communication unit such as communication unit 14 in FIG. 5. At 602, an EOC message is received. Exemplary EOC messages include, discovery probes/responses, inventory requests/responses, keyboard data message, etc. The received EOC message contains a pair identifier field as described above with respect to FIG. 3. At 604, the communication unit extracts the pair ID from the pair identifier field. The pair ID identifies the port from which the EOC message was sent as described above. In this example, the pair ID indicates the port from which the EOC message was sent (e.g. port A or port B).

At 606, the extracted pair ID is compared to an expected value for the pair ID. For example, a message received at port B of communication unit 104 in FIG. 1B expects the pair ID to indicate pair 2 or loop B. In particular, in this embodiment, the pair ID is compared to the pair ID of the port which received the EOC message. Matching pair IDs means that the ports are not connected in a crossover connection. Hence, if the pair IDs match, it is determined if the PLU of the communication unit is configured for crossover operation at 608. If the PLU is not configured for crossover operation, method 600 returns to 602 where another EOC message is received. If the PLU is configured for crossover operation at 608, the communication unit configures the PLU for normal non-crossover operation at 610. That is, the PLU is configured to pass timeslots straight through to the corresponding ports. Method 600 then returns to 602 where another EOC message is received.

If the pair IDs do not match at 606, the communication unit is connected in a crossover connection. Hence, at 612 it is determined if the PLU is configured for crossover operation. If the PLU is configured for crossover operation, method 600 returns to 602 where another EOC message is received. If the PLU is not configured for crossover operation at 612, the communication unit configured the PLU for crossover operation at 614. That is, the PLU is configured to switch timeslots, alarms, etc. between the ports. In particular, the PLU is configured to switch timeslots corresponding to the pair identified by pair ID in the received EOC message to the port which received the EOC message. For example, when configured for crossover operation, a PLU in communication unit 104 of FIG. 1B switches timeslots corresponding to pair 1 or loop A to port B. Method 600 then returns to 602 where another EOC message is received.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A communication system comprising:
    at least two links to carry signals;
    a first communication unit comprising:
        at least two ports, each port configured to transmit and receive signals; and
        a logic unit configured to process the signals transmitted and received by each of the at least two ports in the first communication unit; and
    a second communication unit comprising:
        at least two ports, each port configured to transmit and receive signals and coupled to a respective one of the at least two ports in the first communication unit via a respective one of the at least two links;
        a programmable logic unit configured to process the signals transmitted and received by each of the at least two ports in the second communication unit; and
        a processor configured to detect a crossover connection between one of the at least two ports in the second communication unit and the respective one of the at least two ports in the first communication unit based on an analysis of a pair identifier field in a message received at the second communication unit, wherein the pair identifier field is separate from an address field of the received message and identifies a connection pair of the port in the first communication unit from which the message was received.

2. The communication system of claim 1, wherein the processor is configured to program the programmable logic unit to switch timeslots assigned to a first port of the at least two ports to a second port of the at least two ports and to switch timeslots assigned to the second port to the first port to compensate for the detected crossover connection.

3. The communication system of claim 1, wherein each of the at least two ports in the second communication unit is coupled to a respective one of the at least two ports in the first communication unit via a respective embedded operations channel (EOC), wherein the received message is received at one of the at least two ports on the respective EOC.

4. The communication system of claim 1, wherein the first communication unit is a central unit and the second communication unit is a remote unit.

5. The communication system of claim 1, wherein the programmable logic unit is comprised of one of a field-programmable gate array (FPGA) and a complex programmable logic device (CPLD).

6. The communication system of claim 1, wherein the first and second communication units are G.SHDSL communication units.

7. The communication system of claim 1, wherein one of the at least two links is an active link and another of the at least two links is a back-up link, wherein the first and second communication units switch from the active link to the back-up link when a switch event is detected.

8. The communication system of claim 7, wherein a switch event comprises one of Loss of Sync Word (LOSW) alarm, errored second threshold, margin threshold crossing, loop attention, threshold crossing, and segment defect.

9. A communication unit comprising:
    a first port;
    a second port, each of the first and second ports configured to transmit signals to and receive signals from a respective port of a second communication unit;
    a programmable logic unit to process signals transmitted and received by each of the first and second ports; and
    a processor configured to detect a crossover connection between one of the first and second ports and the respective port of the second communication unit based on an analysis of a pair identifier field in a message received from the second communication unit, wherein the pair identifier field is separate from an address field of the received message and identifies a connection pair of the port in the second communication unit from which the message was received.

10. The communication unit of claim 9, wherein the processor programs the programmable logic unit to switch timeslots assigned to the first port to the second port and to switch timeslots assigned to the second port to the first port to compensate for the detected crossover connection.

11. The communication unit of claim 9, wherein each of the at least two ports in the second communication unit is coupled to a respective one of the at least two ports in the first communication unit via a respective embedded operations channel (EOC), wherein the received message is received at one of the at least two ports on the respective EOC.

12. The communication unit of claim 9, wherein the programmable logic unit is one of a field-programmable logic array (FPGA) and a complex programmable logic device (CPLD).

13. The communication unit of claim 9, wherein each of the first and second ports transmits and receives a copy of the same signals, wherein one port is designated as active and the other is designated as back-up and wherein the processor switches processing signals from the active port to signals from the back-up port when a switch event is detected.

14. The communication unit of claim 13, wherein a switch event comprises one of Loss of Sync Word (LOSW) alarm, errored second threshold, margin threshold crossing, loop attention, threshold crossing, and segment defect.

15. The communication unit of claim 9, wherein the communication unit is a G.SHDSL communication unit.

16. A method of detecting a crossover connection, the method comprising:
   receiving a message containing a pair identifier field at a port in a first communication unit, the message transmitted from a port in a second communication unit, wherein the pair identifier field is separate from an address field in the received message;
   extracting a pair ID from the pair identifier field, the pair ID identifying a connection pair of the port in the second communication unit from which the message was transmitted;
   comparing the received pair ID to the pair ID of the port which received the message to detect a crossover connection, wherein a crossover connection is detected if the received pair ID is not the same as the pair ID of the port at which the message is received.

17. The method of claim 16, wherein receiving a message comprises receiving a message over an Embedded Operation Channel (EOC).

18. The method of claim 16, wherein when a crossover connection is detected, determining if the communication unit is configured for crossover operation; and
   if the communication unit is not configured for crossover operation, configuring a programmable logic unit for crossover operation.

19. The method of claim 18, wherein configuring a programmable logic unit comprises setting a flag in a register inside the programmable logic unit which indicates that crossover operation is enabled.

20. The method of claim 18, wherein if the pair ID of the received message is the same as the pair ID of the port which received the message, determining if the communication unit is configured for crossover operation; and
   if the communication unit is configured for crossover operation, configuring the programmable logic unit for non-crossover operation.

* * * * *